Patented Dec. 13, 1949

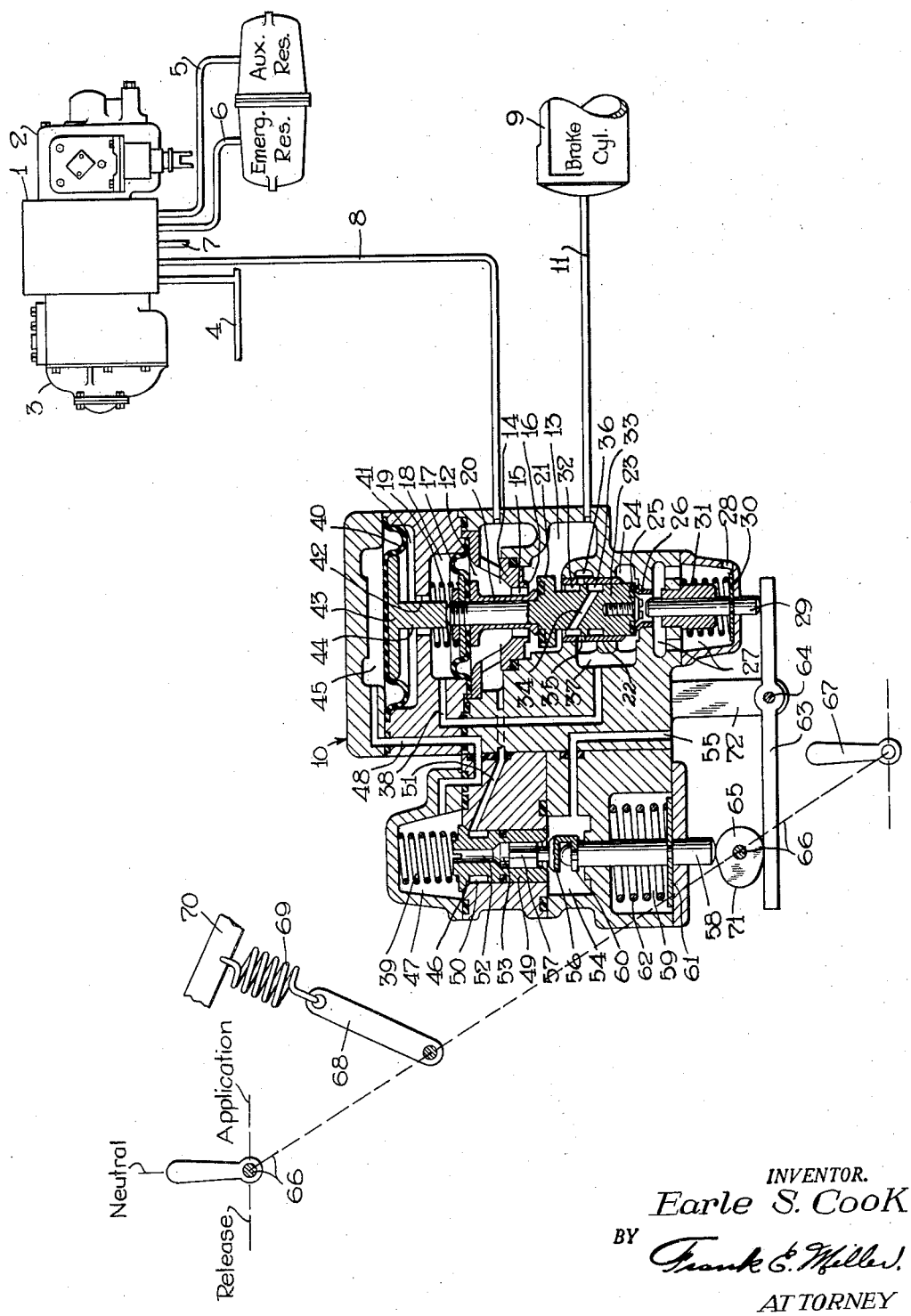

2,490,996

UNITED STATES PATENT OFFICE 2,490,996

APPARATUS FOR CONTROLLING BRAKE CYLINDER PRESSURE

Earle S. Cook, Forest Hills, Pa., assignor to The Westinghouse Air Brake Company, Wilmerding, Pa., a corporation of Pennsylvania Application October 16, 1947, Serial No. 780,128

7 Claims. (Cl. 303—68)

This invention relates to automatic fluid pressure brake equipment, such as the AB type, for use on railway vehicles and more particularly to means for releasing and reapplying the vehicle brakes by fluid under pressure with the brake pipe completely vented.

When a vehicle provided with such equipment and having the reservoir or reservoirs thereof charged with fluid under pressure is cut out of a train for switching operations, inspection of the brake equipment or the like, the brake pipe is completely vented and the brake controlling valve device will move to emergency position and establish communication between said reservoir or reservoirs and the brake cylinder device whereupon the pressure of fluid in said reservoirs will equalize into said brake cylinder device and effect an emergency application of the brakes on the vehicle.

It has heretofore been proposed to provide a brake cylinder release valve device arranged for operation from the side of the vehicle for venting fluid under pressure from the brake cylinder device to release a brake application thus effected without, however, dissipating and wasting the fluid pressure remaining in the partly charged reservoir or reservoirs, so that when the vehicle is again connected into a train less fluid under pressure and less time will be required to recharge the brake equipment, and this is very important, particularly when a number of vehicles are involved, in order to expedite movement of the train.

By way of example, such a brake cylinder release valve device is disclosed in U. S. Patent 2,392,185, issued on January 1, 1946, to L. I. Pickert. This release valve device is disposed in the pipe connecting the brake cylinder device to the well-known AB control valve and is operative manually for closing communication through said pipe between the fluid pressure supply reservoirs and brake cylinder device and for opening the brake cylinder device to atmosphere for releasing the brakes on the vehicle, while at the same time holding the fluid pressure remaining in the reservoirs. With the brakes on the vehicle thus released the vehicle may be freely switched, but when the vehicle is again connected into a train and the brake pipe is recharged for recharging the reservoirs on the vehicle, the release valve device automatically operates to disconnect the brake cylinder device from atmosphere and reestablish the communication between the brake cylinder device and AB control valve to ensure that the brakes will be effective when subsequently desired.

During switching operation of a vehicle there may, however, be times when it is desirable to apply the vehicle brakes with the brake pipe still vented, and while this can be accomplished by operation of the usual hand brake, it is nevertheless more desirable, where fluid under pressure is still stored in the partly charged reservoir or reservoirs, to employ this fluid for accomplishing this end. On the other hand, during yard inspection of railway vehicles it is necessary to apply the brakes on each individual vehicle by fluid under pressure to check the brake cylinder piston travel, and then release the brakes for adjusting such travel to within prescribed limits, and particularly if new brake shoes are applied, these operations may have to be repeated to obtain the desired adjustments. To expedite such inspection and adjustment it is therefore desirable, where fluid under pressure is still stored in the partially charged reservoir or reservoirs on the vehicle, to employ such fluid for operating the brake cylinder device to apply the brakes.

It will therefore be seen that it is desirable to associate with a brake cylinder release valve device such as above described, means controlled manually for applying the brakes by the fluid under pressure remaining in the reservoir or reservoirs on the vehicle and the principal object of the invention is the provision of means for accomplishing this end.

Other objects and advantages will become apparent from the following more detailed description of the invention.

In the accompanying drawing, the single figure is a diagrammatic view, partly in outline and partly in section, of a fluid pressure brake equipment embodying the invention.

Description

As shown in the drawing, I designates the pipe bracket of an AB control valve, the service portion is indicated by 2 and the emergency portion by 3. 4 designates the brake pipe connected to the AB control valve, and 5 and 6 designate pipes connecting, respectively, the auxiliary and emergency reservoirs to the AB control valve. 7 designates the brake cylinder release pipe of the AB control valve adapted to be connected to the usual pressure retaining valve device (not shown), and 8 designates the brake cylinder or application and release pipe connected to said control valve and adapted to be connected to the brake cylinder device 9.

All of the parts so far described are of known construction, the AB control valve being standard on American railroads.

The reference numeral 10 indicates a brake cylinder release and supply valve device including the subject matter of the present invention, said device being interposed between the brake cylinder pipe 8 and a pipe 11 connected to the brake cylinder device 9.

The brake cylinder release and supply valve device 10 comprises a casing having two chambers 12 and 13 connected, respectively, to the pipes 8 and 11. The chambers 12 and 13 are separated by a partition wall 14 having a central aperture 15 and an annular valve seat 16 surrounding said aperture and extending into chamber 13. The chamber 12 is formed at one side of a flexible diaphragm 17 while at the opposite side is a chamber 18 containing a bias spring 19 acting on the diaphragm urging it in the direction of chamber 12. The diaphragm 17 is arranged in coaxial relation to the aperture 15 in partition 14 and a stem 20 connected at one end to said diaphragm and extending through said aperture is connected in chamber 13 to a poppet valve 21 arranged to cooperate with the annular seat 16 for closing communication between chambers 12 and 13. Depending from the valve 21 and having sliding engagement within a bushing 22 secured in the casing is an integral slide valve 23 extending into a chamber 24 and provided on its lower end with a valve 25 arranged to cooperate with an annular casing seat 26 for controlling communication between chamber 24 and a chamber 27 which is open to atmosphere through a port 28. A pin 29 slidably mounted in a suitable bore in the casing in coaxial relation with slide valve 23 has one end for engaging the lower end of said valve while the other end projects to the outside of the casing. In chamber 27 a washer 30 secured to pin 29 is acted upon by one end of a spring 31, the opposite end of which is supported by the casing, for normally holding said pin in the position in which it is shown in the drawing in which the one end is just out of contact with slide valve 23.

The slide valve 23, which is annular in form, is provided with two spaced apart annular grooves 32 and 33 connected together by a diagonal passage 34, the groove 32 being constantly open to chamber 13. With the valve 25 seated the groove 32 is also open through one or more small ports 35 in bushing 22 to an annular cavity 36 encircling said bushing. The cavity 36 is open by a passage 37 to chamber 24 and said passage is also open through another passage 38 to chamber 18 above the diaphragm 17. With the valve 21 in contact with the seat 16, the valve 25 will be unseated, and in this position of the slide valve 23 the ports 35 will be open to cavity 33 in said slide valve. As the slide valve 23 moves from its normal position, in which it is shown in the drawing, to a brake release position defined by contact with seat 16, the annular groove 32 will be disconnected from the bushing ports 35 before said ports are opened to the groove 33.

The structure thus far described may be substantially the same as the structure disclosed in the Pickert patent hereinbefore referred to and its operation is as follows:

With the brakes on the vehicle released the parts so far described will occupy the normal position in which they are shown in the drawing due to the action of spring 19 on diaphragm 17 which will unseat the valve 21 and seat the valve 25. Now assume that the brake equipment has been fully charged with fluid under pressure and that an emergency reduction and complete venting of fluid under pressure from the brake pipe 4 has taken place, due to which the emergency and auxiliary reservoirs will be in communication with the brake cylinder pipe 8 and the pressure of fluid in said reservoirs will therefore be permitted to equalize through said pipe into chamber 12 in the valve device 10, thence past the unseated valve 21 into chamber 13 and through pipe 11 into the brake cylinder device 9 for applying the brakes.

As fluid under pressure is thus being supplied to chambers 12 and 13 for actuating the brake cylinder device 9, fluid from chamber 13 will also flow through the annular groove 32 in the slide valve 23 and ports 35 into the annular cavity 36 and thence through passages 37 and 38 to chamber 17 above the diaphragm 18, whereby the pressure of fluid in chamber 18 will increase at such a rate with respect to the rate of increase in pressure in chamber 12 as to enable spring 19 to prevent movement of diaphragm 17 and thus hold the valve 21 open and the valve 25 closed, the pressure of fluid eventually equalizing in chambers 12 and 18 at opposite sides of said diaphragm, as will be apparent.

In order to now release the brakes on the vehicle without dissipating the fluid pressure still remaining in the emergency and auxiliary reservoirs, the operator will actuate pin 29 against spring 31 and move the valve 25 and slide valve 23 in the direction away from the valve seat 26 against the pressure of spring 19 acting on the diaphragm 17. As the slide valve 23 is thus moved it will initially close communication between the annular groove 32 therein and the ports 35 for cutting off further flow of fluid under pressure from chamber 13 to passages 37 and 38 and thence to diaphragm chamber 18, and since the valve 25 is at the same time unseated, fluid under pressure will then be suddenly vented from said passages and diaphragm chamber to render the pressure of fluid in chamber 12 below the diaphragm effective to promptly deflect said diaphragm against spring 19 for pulling the valve 21 into contact with the seat 16 for closing communication between chambers 12 and 13, and thereby between the emergency and auxiliary reservoirs and the brake cylinder device 9. As the valve 21 is thus moved into contact with seat 16 the annular groove 33 in the slide valves 23 will move into registry with the ports 35 for establishing communication from chamber 13, through the annular groove 32 and passage 34 in the slide valve 23, to the annular groove 33 which now is in registry with the ports 35, whereby fluid under pressure from the brake cylinder device 9 may flow through the communication just described to passage 37 and thence past the open valve 25 to chamber 27 and atmosphere through the passage 28, the flow capacity of said communication being such as to prevent any material increase in pressure in diaphragm chamber 18 by flow from the brake cylinder device 9. It will thus be seen that upon depression of the pin 9 to unseat the valve 25 and seat the valve 21, fluid under pressure will be released from the brake cylinder device 9 for releasing the brakes on the vehicle while the fluid under pressure remaining in the auxiliary and emergency reservoirs following the emergency application will be retained therein.

When the brake pipe 4 is recharged with fluid under pressure, upon connecting the vehicle into a train, the AB control valve will operate in the usual way to open the brake cylinder pipe 8 to the release pipe 7 for releasing fluid under pressure from pipe 8, whereupon fluid under pressure will be released from chamber 12 in the brake cylinder release and supply valve device 10. When the pressure of fluid in chamber 12 is thus sufficiently reduced, spring 19 will deflect the diaphragm 17 downwardly to reopen valve 21 and to close valve 25, the slide valve 23 in this new position reestablishing communication between chamber 13 and diaphragm chamber 18. The application and release valve device 10 is now conditioned to render the brake cylinder device 9 controllable by the AB control valve in the usual manner and will remain so conditioned until again operated to release fluid under pressure from said brake cylinder device, as above described.

According to the invention, I provide in the casing of the brake cylinder release and supply valve device 10, above and in coaxial relation with the diaphragm 17, another diaphragm 40 of greater area than that of diaphragm 17. At one side of diaphragm 40 there is a chamber 41 open to chamber 18 through an aperture 42 in a partition wall separating said chambers. A follower 43 disposed in chamber 41 in contact with one side of diaphragm 40 has a stem 44 freely extending through the aperture 42 into chamber 18 where it engages the diaphragm 17. At the opposite side of diaphragm 20 is a chamber 45.

According to the invention I also provide means for either connecting the chamber 45 to atmosphere or to chamber 12. The means for controlling this connection employed for illustration, while constituting the subject matter of a copending application of Everett P. Sexton, Serial No. 780,364, filed October 17, 1947, and assigned to the assignee of the present application, comprises a valve 46 contained in a chamber 47 which is open through a passage 48 to chamber 45. A spring 39 in chamber 47 acts on valve 46 for urging it to its seat on the casing. The valve 46 is provided on one end of a plunger 49 slidably mounted in the casing and provided adjacent said valve with an annular groove 50. The groove 50 is open to a passage 51 which is connected to chamber 12. The valve 46 is provided with an axial bore 52 open at one end to chamber 47 and extending into the plunger 49 where its opposite end is open to a coaxial bore 53 of larger diameter which opens through the opposite end of the plunger to a chamber 54 which in turn is open to atmosphere through a passage 55. A valve 56 contained in chamber 54 has a fluted stem 57 slidably mounted in the bore 53 and is arranged to cooperate with a seat provided on the adjacent end of plunger 49 for controlling communication between chamber 47 and chamber 54. Also extending into chamber 54 opposite the valve 56 is one end of a pin 58 slidably mounted in suitable bores in the casing and extending through a chamber 59 formed between said bores to the exterior of the casing. The valve 56 has a projecting hook 60 disposed in a recess in the adjacent end of pin 58 whereby the pin is rendered effective to pull said valve from its seat. In chamber 59 a washer 61 secured to pin 58 is subject to the pressure of a spring 62 for actuating said pin to pull the valve 56 out of contact with its seat.

The ends of pins 29 and 58 disposed outside of the casing are arranged in spaced parallel relation to each other and in alignment with opposite ends of a lever 63 which is fulcrumed on a pin 64 arranged closer to the pin 29 than to the pin 58. The pin 64 is carried by a lug 72 depending from the casing of the valve device 10. Interposed between the end of pin 58 and the adjacent end of lever 63 is a cam 65 which is secured to a shaft 66 adapted to extend to opposite sides of the vehicle. On each end of the shaft 66 is a handle 67 for operating said shaft to turn cam 65. The handles 67 are provided for operation by a trainman and will be preferably disposed so that the trainman may operate them either while riding the vehicle or from the ground.

The handles 67, shaft 66 and cam 65 have three positions, namely, a neutral position in which they are shown in the drawing, and release and application positions, respectively, at opposite sides of said neutral position, as indicated in the drawing by appropriate legends.

Also secured to the shaft 66 at any suitable point is one end of a centering lever 68. The other end of lever 68 is connected to one end of a tension spring 69 the other end of which is anchored to a fixed part 70 of the vehicle. The spring 69 is tensioned between the part 70 and its connection with lever 68 for urging said lever, the shaft 66, handles 67 and thereby the cam 65 to their neutral position.

In operation, if fluid under pressure has been supplied to the brake cylinder device 9 for applying the brakes on the vehicle and it is desired to release the vehicle brakes while preventing dissipation of fluid under pressure from the auxiliary and emergency reservoirs, one or the other of the levers 67 will be operated to its release position for thereby turning, against the tension of the centering spring 69, the shaft 66 and cam 65 in a counterclockwise direction, as viewed in the drawing. This movement of cam 65 will turn a raised portion 71 thereof against the adjacent end of lever 63 and actuate said lever about its fulcrum pin 64 to actuate the pin 29 for unseating the release valve 25. Upon unseating of the release valve 25 fluid under pressure will be vented from diaphragm chamber 18 whereupon the diaphragm 17 will be actuated by pressure of fluid in chamber 12 to close the valve 21 and open the valve 25, whereupon fluid under pressure will be released from the brake cylinder device 9 for releasing the brakes on the vehicle, and communication therebetween and the emergency and auxiliary reservoirs will be closed for holding the fluid pressure remaining in said reservoirs. As soon as the valve 25 is opened, the operator may let go of the handle 67 whereupon said handle, the shaft 66, and the cam 65 will remain closed and the valve 25 open by the action of centering spring 69, but the valve 21 will remain closed and the vlave 25 open by the pressure of fluid in chamber 12 acting on diaphragm 17.

If after the brakes have been released, as just described, the operator desires to reapply the brakes by fluid under pressure remaining in the auxiliary and emergency reservoirs, he will operate either handle 67 to its application position for thereby turning the shaft 66 and cam 65 in a clockwise direction. As the cam 65 is thus operated the raised portion 71 thereof will act to move pin 58 against spring 62. This movement of pin 58 will first seat the valve 56 against the plunger 49 and then act through said plunger to unseat the valve 46, whereupon fluid under pressure from chamber 12, which is still open to the auxiliary and emergency reservoirs, will flow to diaphragm chamber 45 by way of passage 51, past the open valve 46 and thence through passage 48. Chamber 41 below the diaphragm 40 and chamber 18 above the diaphragm 17 are at this time open to atmosphere through the open release valve 25, and due to the larger area of diaphragm 40 the pressure of fluid provided in chamber 45 and acting thereon provides a force sufficiently exceeding the opposing force of fluid pressure in chamber 12 acting on the smaller diaphragm 17 to deflect both of the diaphragms in a downwardly direction for thereby opening the valve 21 and closing the valve 25, whereupon fluid under pressure in the auxiliary and emergency reservoirs may flow past the former valve to the brake cylinder device 9 for reapplying the brakes.

With the valve 21 thus open and the valve 25 seated, fluid under pressure supplied to chamber 13 will also flow through the slide valve 23 to passage 38 and then into diaphragm chamber 18 wherein it will act to balance the opposing pressure of fluid in chamber 12 and render spring 19 effective to hold the valve 21 open and the valve 25 closed. As soon as this occurs the operator may let go of the operating handle 67 to permit spring 69 to return said handle, the shaft 66 and the cam 65 to their neutral position in which they are shown in the drawing, whereupon spring 62 will return pin 58 to its normal position in which it also is shown in the drawing. As the pin 58 is thus returned to its normal position spring 39 acting on valve 46 will move said valve and the plunger 49 along with said pin until said valve becomes seated, following which continued movement of said pin will open the valve 56. With the valve 46 thus closed, communication between passage 51 and diaphragm chamber 45 is closed to prevent further flow of fluid under pressure to said chamber, while upon unseating of valve 56 said chamber is open through the axial bores 52 and 53 to chamber 54 and thence to atmosphere through passage 55. As a result, fluid under pressure will be released from diaphragm chamber 45, but the diaphragm 17 will remain in the position for opening valve 21 and closing valve 25 due to the equalization of fluid pressures on opposite sides of said diaphragm and the action of spring 19.

With the brakes thus reapplied on the vehicle, if the operator desires to again release the brakes he will operate one of the handles 67 to its release position whereupon the brake cylinder release and supply valve device 10 will again operate in the same manner as above described for closing communication between the emergency and auxiliary reservoirs and the brake cylinder device 9 and for opening said brake cylinder device to atmosphere whereupon a release of fluid under pressure will occur therefrom for releasing the brakes. After the brakes have been thus released, if the trainman desires to again apply the brakes he will turn one of the handles 67 to its application position whereupon a reapplication will occur in the same manner as above described.

The brakes on the vehicle may thus be released and reapplied so long as sufficient fluid pressure remains in the auxiliary and emergency reservoirs for actuating the brake cylinder device 9. It will be apparent however that the pressure obtained in the brake cylinder device 9 by equalization therein of fluid pressure in the auxiliary and emergency reservoirs will be less for each application but will still be sufficient during several applications for moving the brake shoes on the vehicle into contact with the car wheels for the inspection and adjustment purposes above mentioned.

Whenever the vehicle is again cut into a train and the brake pipe 4 is recharged causing operation of the AB control valve to open the brake cylinder pipe 8 to atmosphere, the venting of fluid under pressure from chamber 12 will permit operation of spring 19 to open the valve 21 and close the valve 25, if said valves are not already thus conditioned to insure that the brake cylinder device 9 will be connected to the AB control valve during subsequent operation of the vehicle in the train. If, however, the usual pressure retaining valve device (not shown) employed on freight vehicles to retain a chosen pressure in the brake cylinder devices thereon during cycling operation while descending a grade is turned up on a vehicle the retained brake cylinder pressure present in the brake cylinder pipe 8 and chamber 12 may prevent spring 19 from opening the valve 21 and closing valve 25. In such a case either handle 67 may be operated to its application position whereupon the large diaphragm 40 will operate to open valve 21 and close valve 25 against the opposing retained pressure of fluid in pipe 8 and chamber 12.

*Summary*

From the above description it will now be seen that after a vehicle has been set out of a train with the brakes applied in emergency and the brake pipe vented, a trainman may by operation of either handle 67 release the brakes on the vehicle and retain the fluid pressure remaining in the auxiliary and emergency reservoirs at that time. If desired he may reapply the brakes by fluid under pressure from the auxiliary and emergency reservoirs and subsequently release the brakes and continue such application and release as long as adequate fluid pressure remains in said reservoirs for actuating the brake cylinder device 9.

Having now described the invention, what I claim as new and desire to secure by Letters Patent is:

1. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a normal position for establishing a communication through which fluid under pressure may flow between said brake application and release pipe and said second pipe for applying and releasing the brakes, means operative manually for actuating said valve means to close said communication and open said second pipe to atmosphere, fluid pressure responsive means for returning said valve means to said normal position, and means on said vehicle, other than said brake controlling valve device, for controlling operation of said fluid pressure responsive means.

2. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a brake release position for closing communication from said brake application and release pipe to said second pipe and for opening said second pipe to atmosphere, and having a normal position for disconnecting said second pipe from atmosphere and for opening same to said brake application and release pipe, movable abutment means connected to said valve means and subject to pressure of fluid in said brake application and release pipe opposing pressure of fluid in a chamber, spring means acting on said valve means for moving same to said normal position upon substantial equalization of fluid pressures on opposite sides of said abutment means; said valve means in said normal position opening said chamber to said brake application and release pipe and in said brake release position opening said chamber to atmosphere, a first means for effecting movement of said valve means from said normal position to said brake release position, a second means, other than said spring means, for effecting movement of said valve means from said release position to said normal position, and manual means for effecting operation of said first means and of said second means.

3. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a brake release position for closing communication from said brake application and release pipe to said second pipe and for opening said second pipe to atmosphere, and having a normal position for disconnecting said second pipe from atmosphere and for opening same to said brake application and release pipe, movable abutment means connected to said valve means and subject to pressure of fluid in said brake application and release pipe opposing pressure of fluid in a chamber, spring means acting on said valve means for moving same to said normal position upon substantial equalization of fluid pressures on opposite sides of said abutment means; said valve means in said normal position opening said chamber to said brake application and release pipe and in said brake release position opening said chamber to atmosphere, a first means for effecting movement of said valve means to said brake release position, means operable by fluid under pressure for moving said valve means to said normal position and rendered ineffective upon release of such fluid under pressure, and manually operable means for operating said first means and for also supplying fluid under pressure to and releasing fluid under pressure from said fluid pressure operable means.

4. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a brake release position for closing communication from said brake application and release pipe to said second pipe and for opening said second pipe to atmosphere, and having a normal position for disconnecting said second pipe from atmosphere and for opening same to said brake application and release pipe, movable abutment means connected to said valve means and subject to pressure of fluid in said brake application and release pipe opposing pressure of fluid in a chamber, spring means acting on said valve means for moving same to said normal position upon substantial equalization of fluid pressures on opposite sides of said abutment means; said valve means in said normal position opening said chamber to said brake application and release pipe and in said brake release position opening said chamber to atmosphere, a first means operative to effect movement of said valve means to said brake release position, other movable abutment means adapted to be subjected to pressure of fluid in an actuating chamber for moving said valve means to said normal position, a second means operative to selectively supply fluid under pressure to and release fluid under pressure from said actuating chamber, and manual means for operating said first means and said second means.

5. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a brake release position for closing communication from said brake application and release pipe to said second pipe and for opening said second pipe to atmosphere, and having a normal position for disconnecting said second pipe from atmosphere and for opening same to said brake application and release pipe, movable abutment means connected to said valve means and subject to pressure of fluid in said brake application and release pipe opposing pressure of fluid in a chamber, spring means acting on said valve means for moving same to said normal position upon substantial equalization of fluid pressures on opposite sides of said abutment means; said valve means in said normal position opening said chamber to said brake application and release pipe and in said brake release position opening said chamber to atmosphere, other movable abutment means operable by fluid under pressure to move said valve means to said normal position against pressure of fluid from said brake application and release pipe acting on the first named movable abutment means, a first means for effecting movement of said valve means to said brake release position, a second means for selectively supplying fluid under pressure to said second movable abutment means for actuating same and for releasing such fluid under pressure therefrom, and manual means for operating said first means and said second means.

6. A manually operative brake application and release valve device for use with a vehicle fluid pressure brake equipment of the type comprising a brake pipe, at least one normally charged fluid storage reservoir, a brake application and release pipe, a second pipe to which fluid under pressure is adapted to be supplied from said brake application and release pipe to effect an application of brakes on the vehicle, and a brake controlling valve device operative upon venting of fluid under pressure from said brake pipe to establish communication between said reservoir and said brake application and release pipe, said brake application and release valve device comprising valve means having a brake release position for closing communication from said brake application and release pipe to said second pipe and for opening said second pipe to atmosphere, and having a normal position for disconnecting said second pipe from atmosphere and for opening same to said brake application and release pipe, movable abutment means connected to said valve means and subject to pressure of fluid in said brake application and release pipe opposing pressure of fluid in a chamber, spring means acting on said valve means for moving same to said normal position upon substantial equalization of fluid pressures on opposite sides of said abutment means; said valve means in said normal position opening said chamber to said brake application and release pipe and in said brake release position opening said chamber to atmosphere, other movable abutment means of greater area than the first named abutment means arranged in coaxial relation with said first abutment means and subject on the side adjacent said first abutment means to pressure of fluid in said chamber, means connecting said other movable abutment means to said first movable abutment means for rendering pressure of fluid acting on the opposite side of said other movable abutment means effective to move said valve means to said normal position against pressure of fluid from said brake application and release pipe acting on said first movable abutment means, a first means for moving said valve means to said brake release position, a second means for selectively establishing a fluid pressure supply communication from said brake application and release pipe to said opposite side of said other abutment means and for closing such communication and opening said opposite side of said other movable abutment means to atmosphere, and manual means for operating said first means and said second means.

7. The combination with a fluid pressure controlled device and means for supplying fluid under pressure to and for releasing fluid under pressure from said device, of valve structure controlling communication between said device and said means comprising valve means having a normal position for opening said communication and a second position for closing said communication and for releasing fluid under pressure from said device, means operative manually for effecting movement of said valve means to said second position, fluid pressure responsive means for returning said valve means to said normal position, and manually operable means for supplying fluid under pressure to said fluid pressure responsive means.

EARLE S. COOK.

REFERENCES CITED

The following references are of record in the file of this patent:

UNITED STATES PATENTS

| Number | Name | Date |
| --- | --- | --- |
| 1,464,640 | Breck et al. | Aug. 14, 1923 |
| 2,287,775 | Baker et al. | June 30, 1942 |
| 2,392,185 | Pickert | Jan. 1, 1946 |